US009225054B2

United States Patent
Pan et al.

(10) Patent No.: US 9,225,054 B2
(45) Date of Patent: Dec. 29, 2015

(54) DEVICE, SYSTEM AND METHOD OF COMMUNICATING VIA A DUAL DIRECTIONAL ANTENNA

(71) Applicant: INTEL CORPORATION, Santa Clara, CA (US)

(72) Inventors: Helen Kankan Pan, Saratoga, CA (US); Raanan Sover, Haifa (IL); Eran Gerson, Pardes Hana (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/718,307

(22) Filed: May 21, 2015

(65) Prior Publication Data

US 2015/0255852 A1    Sep. 10, 2015

Related U.S. Application Data

(63) Continuation of application No. 13/528,997, filed on Jun. 21, 2012, now Pat. No. 9,059,502.

(51) Int. Cl.
*H04B 7/00* (2006.01)
*H01Q 1/22* (2006.01)
*H04B 1/3827* (2015.01)
*H04B 1/38* (2015.01)
*H01Q 1/08* (2006.01)
*H01Q 1/24* (2006.01)

(52) U.S. Cl.
CPC ............. *H01Q 1/2266* (2013.01); *H01Q 1/084* (2013.01); *H04B 1/38* (2013.01); *H04B 1/3827* (2013.01); *H01Q 1/242* (2013.01)

(58) Field of Classification Search
CPC ....... H01Q 1/242; H01Q 1/245; H01Q 1/084; H01Q 3/20
USPC ............. 455/500, 550.1, 575.1, 575.3, 575.5, 455/575.7, 90.3, 90.1, 575.8, 556.1, 556.2, 455/557, 422.1, 403; 343/702, 882, 757; 379/433.01, 433.11, 433.13, 440
See application file for complete search history.

(56) References Cited

U.S. PATENT DOCUMENTS

| | | | |
|---|---|---|---|
| 6,249,256 B1 | 6/2001 | Luxon et al. | |
| 8,588,872 B2 | 11/2013 | Honma | |
| 8,750,948 B2 | 6/2014 | Wong et al. | |
| 9,059,502 B2 | 6/2015 | Pan et al. | |
| 2005/0266901 A1 | 12/2005 | Pan | |

(Continued)

OTHER PUBLICATIONS

Office Action for U.S. Appl. No. 13/528,997, mailed on Oct. 9, 2014, 17 pages.

*Primary Examiner* — Keith Ferguson
(74) *Attorney, Agent, or Firm* — Shichrur & Co.

(57) ABSTRACT

Some demonstrative embodiments include devices, systems and/or methods of wireless communication via a dual directional antenna. For example, a device may include a hinge to connect between first and second elements to allow rotating the first element between first and second rotational states with respect to the second element, and a rotatable dual directional wireless communication antenna coupled to the hinge. The dual directional wireless communication antenna may be configured to communicate wireless communication signals in a first direction, when the first element is at the first rotational state, and to communicate the wireless communication signals in a second direction, different from the first direction, when the first element is at the second rotational state.

21 Claims, 8 Drawing Sheets

(56) References Cited

U.S. PATENT DOCUMENTS

2006/0082506 A1 4/2006 Fang
2009/0239593 A1 9/2009 Jayasinghe et al.
2011/0062234 A1* 3/2011 Oishi ........................... 235/439
2013/0002494 A1 1/2013 Ayala et al.

* cited by examiner

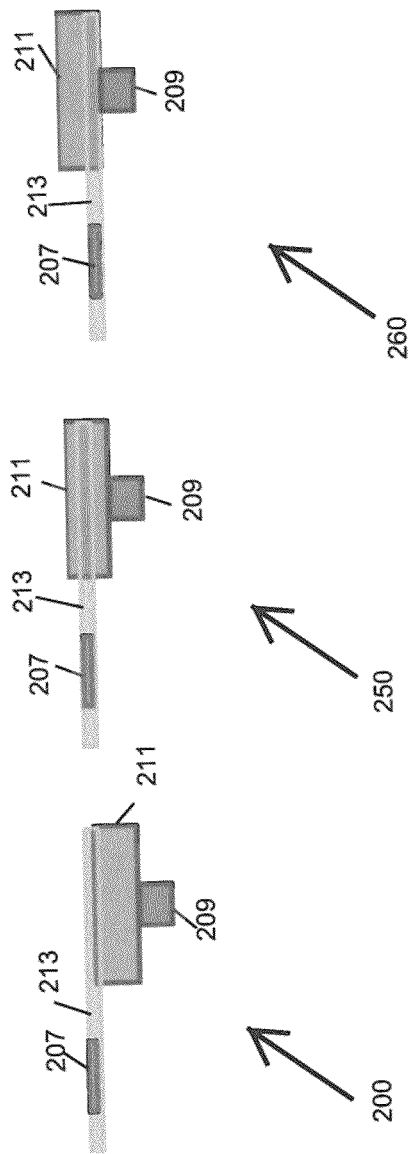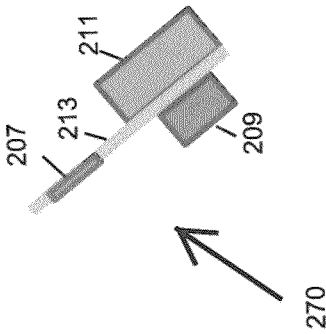

DEVICE, SYSTEM AND METHOD OF COMMUNICATING VIA A DUAL DIRECTIONAL ANTENNA

CROSS REFERENCE

This application is a Continuation Application of U.S. patent application Ser. No. 13/528,997, filed on Jun. 21, 2012, the entire disclosure of which is incorporated herein by reference.

BACKGROUND

A mobile device, e.g., a laptop computer, a notebook computer, an ultrabook computer, or the like, may be able to communicate via one or more antennas.

The mobile device may be configured to communicate over a millimeter wave (mmwave) wireless communication band. The mobile device may utilize high directional antennas, e.g., a phased array antenna, to overcome a path loss of wireless communication signals of the mmwave wireless communication band.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 2A, 2B, 2C, and 2D are schematic illustrations of four respective Radio-Frequency (RF) configurations including a wireless communication antenna, in accordance with some demonstrative embodiments.

DETAILED DESCRIPTION

Figure 1:
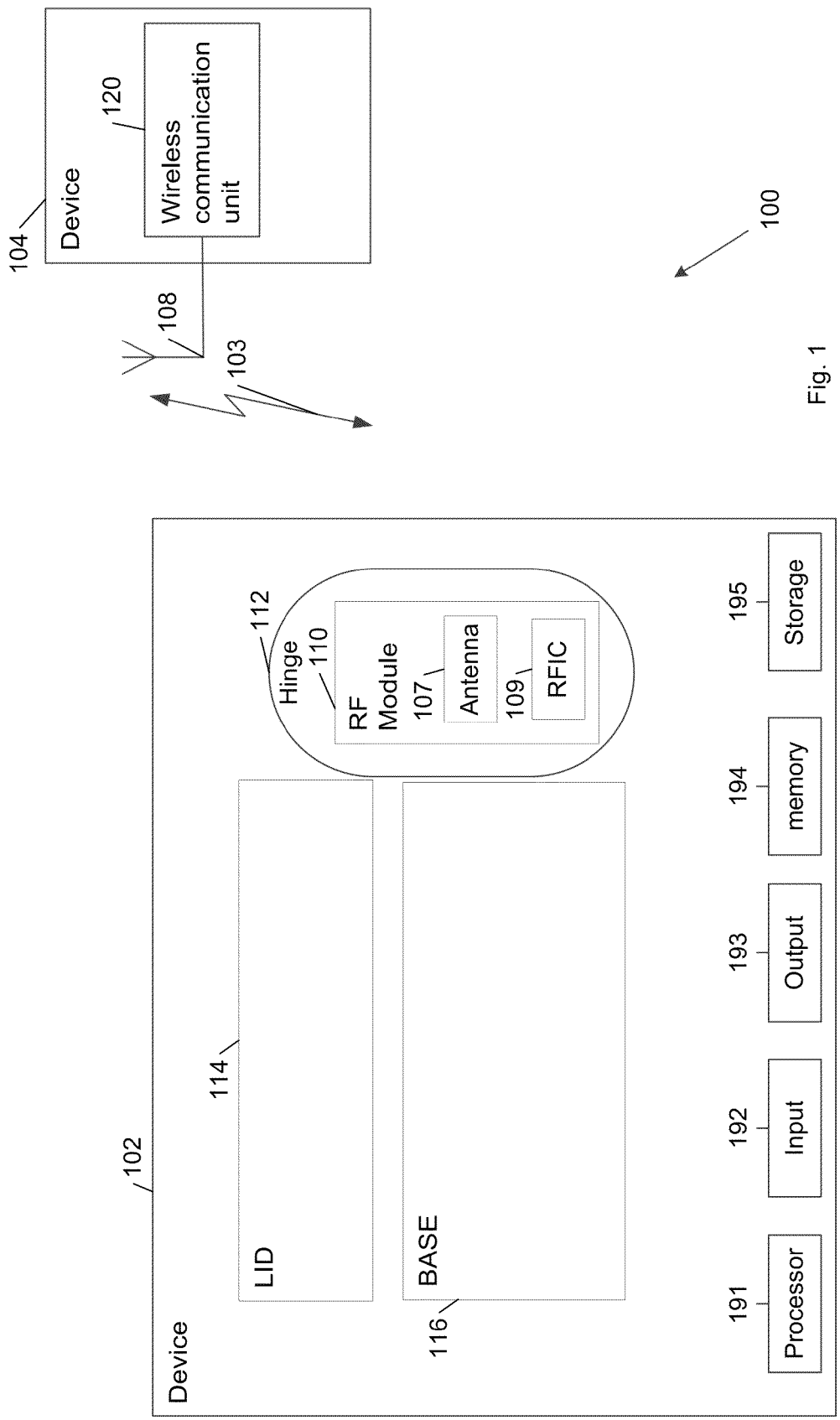
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, an ultrabook computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE802.11 task group ac (TGac) ("IEEE802.11-09/0308r12—TGac Channel Model Addendum Document"), IEEE 802.11 task group ad (TGad) (IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless—WirelessHD™ specifications and/or future versions and/or derivatives thereof, units and/or devices which are part of the above networks, one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee, Ultra-Wideband (UWB), Global System for Mobile communication (GSM), 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "directional band" (DBand), as used herein, may relate to a frequency band wherein the channel starting frequency is above 45 GHz.

The phrase "DBand antenna", as used herein, may relate to a phased array, a single element antenna, or a set of switched beam antennas covered by a quasi-omni antenna pattern.

The phrase "quasi-omni antenna pattern", as used herein, may include a DBand antenna operating with a widest practical beamwidth attainable for a particular antenna.

The phrase "Ultra Band (UB)", as used herein, may relate to the frequency band of 57-66 GHz.

The term "beamforming", as used herein, may relate to a spatial filtering mechanism, which may be used at a transmitter and/or a receiver to improve the received signal power or signal-to-noise ratio (SNR) at an intended receiver.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments include a device including a hinge to connect between first and second elements to allow rotating the first element between first and second rotational states with respect to the second element, and a dual directional wireless communication antenna coupled to the hinge, the dual directional wireless communication antenna is configured to communicate wireless communication signals in a first direction, when the first element is at the first rotational state, and to communicate the wireless communication signals in a second direction, different from the first direction, when the first element is at the second rotational state.

In some demonstrative embodiments, the first element may include a lid of the device, and the second element may include a base of the device.

In some demonstrative embodiments, the first state may include an open state at which a ninety-degree angle is formed between the lid and base, and the second state may include a closed state at which a zero-degree angle is formed between the lid and base.

In some demonstrative embodiments, the device may include a portable computing device, for example, a laptop computer, an ultrabook computer, a netbook computer, and the like.

In some demonstrative embodiments, the rotatable dual directional wireless communication antenna may include an antenna element conformed to a shape of the hinge.

In some demonstrative embodiments, the rotatable dual directional wireless communication antenna may be integrated within the hinge.

In some demonstrative embodiments, the rotatable dual directional wireless communication antenna may include a flexible antenna element integrated with a radio-frequency integrated chip (RFIC).

In some demonstrative embodiments, the hinge may include a non-metal hinge.

In some demonstrative embodiments, the first and second elements may be covered by metallic material.

In some demonstrative embodiments, the second direction may be opposite to the first direction.

In some demonstrative embodiments, the wireless communication signals may include millimeter-wave (mmwave) signals.

In some demonstrative embodiments, the dual directional wireless communication antenna may include a phased array antenna.

In some demonstrative embodiments, the dual directional wireless communication antenna may include a dipole antenna.

Some demonstrative embodiments include computing device including a radio, a lid, a base, and a hinge connecting between the lid and the base to allow rotating the lid between first and second rotational states with respect to the base, the hinge including a dual directional wireless communication antenna configured to communicate wireless communication signals in a first direction, when the lid is at the first rotational state, and to communicate the wireless communication signals in a second direction, different from the first direction, when the lid is at the second rotational state.

Some demonstrative embodiments include a method including rotating a dual directional wireless communication antenna, which is coupled to a hinge connecting between first and second elements of a device, by rotating the first element between first and second rotational states with respect to the second element; communicating by the dual directional wireless communication antenna wireless communication signals in a first direction, when the first element is at the first rotational state; and communicating by the dual directional wireless communication antenna the wireless communication signals in a second direction, different from the first direction, when the first element is at the second rotational state.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 104, capable of communicating content, data, information and/or signals over a wireless communication medium 103, for example, a radio channel, an IR channel, an RF channel, a Wireless Fidelity (WiFi) channel, and the like.

In some demonstrative embodiments, devices 102 and/or 104 may include, for example, one or more wireless transmitters, receivers and/or transceivers able to send and/or receive wireless communication signals, RF signals, frames, blocks, transmission streams, packets, messages, data items, and/or data. For example, device 104 may include a wireless communication unit 120 associated with one or more antennas 108, and device 102 may include an RF module ("radio") 110 associated with at least one antenna 107.

In some demonstrative embodiments, antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. For example, antennas 107 and/or 108 may include a phased array antenna, a single element antenna, a set of switched beam antennas, and/or the like.

In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, device 102 may include, or may be included as part of a mobile or portable device, for example, a mobile computer, a laptop computer, an ultrabook computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile phone, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may include a base 116 including one or more components of device 102, e.g., a battery and/or a keyboard.

In some demonstrative embodiments, device 102 may include a lid 114 configured to cover base 116, and to include one or more components of device 102, e.g., a display and/or a camera.

In some demonstrative embodiments, base 116 and lid 114 may be covered by metallic material, e.g., due to design and/or manufacturing considerations.

In some demonstrative embodiments, placing antenna 107 within lid 114 or base 116 may result in reduced wireless communication performance and/or efficiency, for example, since the metallic material of lid 114 and/or base 116 may affect a radiation pattern of antenna 107.

In some demonstrative embodiments, device 102 may include a hinge 112 configured to connect between lid 114 and base 116.

In some demonstrative embodiments, hinge 112 may include a non-metal hinge. For example, hinge 112 may be formed of a non-metal material, for example, a plastic material, e.g., to enable a physical connection between lid 114 and base 116.

In some demonstrative embodiments, antenna 107 may be coupled to hinge 112.

In some demonstrative embodiments, hinge 112 may be configured to allow rotating lid 114 between first and second rotational states with respect to base 116.

In some demonstrative embodiments, the first state may include an open state, at which a first angle, e.g., of about ninety-degrees, is formed between lid 114 and base 116, and the second state may include a closed state, at which a second angle, e.g., of about zero degrees, is formed between lid 114 and base 116.

In one example, device 102 may include a mobile computer, e.g., an ultrabook computer. Lid 114 may include a lid of the ultrabook computer and base 116 may include a base of the ultrabook computer. Lid 154 and base 116 may be covered with a metallic material to provide an aesthetic and/or durable look to the ultrabook computer, whereas hinge 112 may be formed of a plastic material. Lid 114 may include, for example, a display of the ultrabook computer, and base 116 may include, for example, a keyboard, a mouse, a memory, a storage device and/or a battery of the ultrabook computer.

The open state may relate, for example, to a working state, at which a user of the ultrabook computer may be able to utilize one or more components of the ultrabook, for example, by utilizing the display and/or the keyboard of the ultrabook computer, e.g., for editing a document and/or the like.

The closed state may relate, for example, to an idle state, a standby state, a power save mode and/or the like, at which the user is not working on the ultrabook computer, although the ultrabook computer may be able to perform one or more processes and/or functionalities, e.g., communicating over wireless medium 103, downloading content, and/or the like.

In some demonstrative embodiments, device 102 may communicate wireless communication signals over a mmwave wireless communication band, e.g., the DBand.

In some demonstrative embodiments, antenna 107 may include a DBand antenna, e.g., a phased array antenna, to enable communication over the mmwave wireless communication band.

In some demonstrative embodiments, antenna 107 may rotate between two or more positions according to a rotation of hinge 112. For example, antenna 107 may rotate when lid 114 is rotated, e.g., between the closed and open states.

In some demonstrative embodiments, coupling a single radiation antenna to hinge 112 may result in reduced wireless communication performance and/or efficiency. For example, rotating lid 114, may affect a directionality of a radiation pattern of the single radiation antenna, which may result in the single radiation antenna not being able to communicate, e.g., when lid 114 is at the open state and/or the closed state.

In some demonstrative embodiments, antenna 107 may include a dual directional wireless communication antenna, which may be configured to communicate wireless signals in a first direction, when lid 114 is at the open state, and to communicate the wireless signals in a second direction, different from the first direction, when lid 114 is at the closed state, e.g., as described below.

In some demonstrative embodiments, antenna 107 may be configured to communicate the wireless signals in the first direction, when lid 114 is at the open state, and to communicate the wireless signals in the second direction, e.g., opposite to the first direction, when lid 114 is at the closed state. For example, antenna 107 may communicate in a forward direction with respect to device 102, e.g., when lid 114 is at the closed state, and antenna 107 may communicate in a backward direction with respect to device 102, e.g., when lid 114 is at the open state, e.g., as described below with reference to FIGS. 4A and 4B.

In some demonstrative embodiments, antenna 107 may be integrated within hinge 112. For example, antenna 107 may be located within hinge 112, and/or may be implemented as part of hinge 112.

In some demonstrative embodiments, antenna 107 may include an antenna element conformed to a shape of hinge 112. For example, the antenna element may include a flexible element, which may be bent and/or adjusted to conform to a shape of hinge 112, e.g., as described below with reference to FIG. 3.

In some demonstrative embodiments, antenna 107 may include and/or may perform the functionality of a phased array antenna, a dipole antenna or any other type of antenna.

In some demonstrative embodiments, antenna 107 may include a planar antenna, e.g., as described below.

In some demonstrative embodiments, antenna 107 may include a patch design, a slot design a slot loop and/or the like, e.g., as described below with reference to FIGS. 5 and 6.

In some demonstrative embodiments, antenna 107 may be integrated as part of an RF integrated chip (RFIC) 109, e.g., as described below with reference to FIGS. 2A, 2B and/or 2C.

For example, antenna 107 and RFIC 109 may be enclosed in a common housing or packaging, e.g., within hinge 112, and may be interconnected or operably associated, for example, to maximize a performance of device 102, e.g., by minimizing packaging routing loss.

In some demonstrative embodiments, antenna 107 and RFIC 109 may be implemented as part of RF module 110.

In some demonstrative embodiments, RF module 110, RFIC 109 and antenna 107 may be implemented in other, different configurations, e.g., as separate units and/or devices. In one example, antenna 107 may be included as part of hinge 112, and RFIC 109 may be included as part of RF module 110 located within base 116. In another example, RFIC 109 may include or may be included as part of a wireless Network Interface Card (NIC) integrated within base 116.

Wireless communication device 102 may also include, for example, one or more of a processor 191, an input unit 192, an output unit 193, a memory unit 194, and a storage unit 195. Wireless communication device 102 may optionally include other suitable hardware components and/or software components. In some demonstrative embodiments, some or all of the components of one or more of wireless communication device 102 may be enclosed in lid 114 and/or base 116.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102, and/or of one or more suitable applications.

Input unit 192 includes, for example, a keyboard, a keypad, a mouse, a touch-pad, a track-ball, a stylus, a microphone, or other suitable pointing device or input device. Output unit 193 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102.

In some demonstrative embodiments, one or more components of device 102, e.g., processor 191, a keyboard and/or a mouse, may be enclosed within base 116, and/or one or more components of device 102, e.g., a display and/or a webcam, may be enclosed within lid 114.

Reference is now made to FIGS. 2A, 2B, 2C and 2D, which schematically illustrate four respective configurations of an RF module, e.g., RF modules 200, 250, 260 and 270, including an antenna 207 and a RFIC 209 integrated on one or more board layers 211, in accordance with some demonstrative embodiments. For example, antenna 207 may perform the functionality of antenna 107 (FIG. 1), and/or RFIC 209 may perform the functionality of RFIC 109 (FIG. 1).

As shown in FIG. 2A, RF module 200 may include RFIC 209 attached to a bottom board layer 211. Antenna 207 may be built on at least one extended board layer, e.g., extended board layer 213, of board layers 211. For example, extended board layer 213 may include at least one dielectric layer, and antenna 207 may include one or more metal layers attached to extended board layer 213, e.g., one metal layer on each side of extended board layer 213. In one example, antenna 207 may include a single metal layer attached to board layer 213, e.g., as described below with reference to FIG. 6. In another example, antenna 207 may include two metal layers attached to board layer 213, e.g., as described below with reference to FIG. 5. Antenna 207 may have any suitable design and/or shape, e.g., a patch, a slot, a slot loop and the like, e.g., as described below.

As shown in FIG. 2A, extended board layer 213 may be located on top of board layers 211. As shown in FIG. 2B, extended board layer 213 may be sandwiched between board layers 211. As shown in FIG. 2C, extended board layer 213 may be located at a bottom of board layers 211. A position of extended board layer 213 respective to board layers may be determined, for example, according to architecture and/or design considerations.

In some demonstrative embodiments, extended board layer 213 may be formed of a rigid material.

As shown in FIG. 2D, if the extended board layer 213 is formed of a rigid material, RF module 200 may be positioned at a predefined tilt angle, e.g., such that antenna 207 may positioned at a predefined required tilt angle.

In some demonstrative embodiments, extended board layer 213 may be formed of a flexible material to enable bending antenna 207 to form a predefined angle with a reference element, e.g., as described below.

Figure 3:
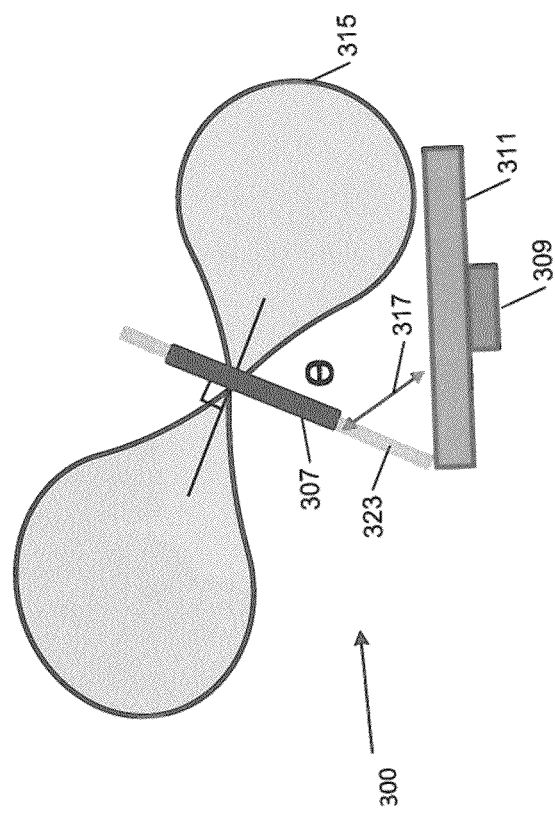
FIG. 3 is a schematic illustration of an RF configuration including a rotatable antenna, in accordance with some demonstrative embodiments.

Reference is now made to FIG. 3, which schematically illustrates a configuration of an RF module 300 including a rotatable antenna 307, in accordance with some demonstrative embodiments. For example, RF module 300 may perform the functionality of RF module 110 (FIG. 1), and/or antenna 307 may perform the functionality of antenna 207 (FIG. 2) and/or antenna 107 (FIG. 1).

In some demonstrative embodiments, RF module 300 may include an RFIC 309 integrated on one or more board layers 311 and a flexible extended board layer 323, which may be formed of a flexible material. For example, RFIC 309 may perform the functionality of RFIC 209 (FIG. 2) and/or board layers 311 may perform the functionality of board layers 211 (FIG. 2).

As shown in FIG. 3, antenna 307 may be formed on flexible board layer 323.

As shown in FIG. 3, utilizing flexible extended board layer 323 may enable fixedly rotating antenna 307 to a desired tilt angle by bending a portion of flexible extended board layer 323.

In some demonstrative embodiments, bending flexible extended board layer 323 may require more space for implementation, e.g., due to the 3 dimensional (3D) shape of flexible extended board layer 323. However, bending flexible extended board layer 323 may enable a relatively lower operating frequency, and/or a relatively greater directional gain, which may provide an advantage for antenna design. For example, bending flexible extended board design 323 may utilize the 3D structure of a chassis of device 102 (FIG. 1) to maximize a performance of antenna 107 (FIG. 1).

As shown in FIG. 3, flexible extended board layer 323 may be bent to form a predefined angle 317, denoted θ, between board layers 311 and antenna 307.

As shown in FIG. 3, antenna 307 may have a dual radiation pattern 315, e.g., including a first radiation pattern in a first direction ("front direction") and a second radiation pattern in a second direction ("back direction") with respect to flexible extended board layer 323.

In some demonstrative embodiments, antenna 307 may be formed of an individual dual radiation antenna element, which may form a dual radiation phased array antenna. Antenna 307 may include a patch design, a slot design a slot loop and/or the like, e.g., as described below with reference to FIGS. 5 and 6.

Reference is now made to FIGS. 4A and 4B, which schematically illustrate a dual directional radiation antenna 407 rotated between closed and open states of a lid 414 of a mobile device 400, in accordance with some demonstrative embodiments.

FIG. 4A demonstrates a radiation pattern 426 of antenna 407 when lid 414 is at the closed state, and FIG. 4B demonstrates a radiation pattern 428 of antenna 407 when lid 414 is at the open state. For example, mobile device 400 may perform the functionality of device 102 (FIG. 1), lid 414 may perform the functionality of lid 114 (FIG. 1) and antenna 407 may perform the functionality of antenna 107 (FIG. 1) and/or antenna 307 (FIG. 3).

As shown in FIGS. 4A and 4B, mobile device 400 may include a base 416, which is connected to lid 414 by a hinge 412. For example, base 416 may perform the functionality of base 116 (FIG. 1) and hinge 412 may perform the functionality of hinge 112 (FIG. 1).

As shown in FIGS. 4A and 4B, antenna 407 may include or may be included as part of an RF module 420, which is located within hinge 412. For example, RF module 420 may perform the functionality of RF module 300 (FIG. 3) and/or RF module 110 (FIG. 1).

As shown in FIGS. 4A and 4B, antenna 407 may be positioned at a predefined angle 417, e.g., corresponding to angle 317 (FIG. 3). Angle 417 may be determined such that antenna 407 may conform to a shape of hinge 412, e.g., to enable fitting antenna 407 within or on hinge 412.

In some demonstrative embodiments, angle 417 may be determined to maximize a performance of antenna 407, e.g., when lid 414 is at the open and closed states.

As shown in FIG. 4A, an angle of about zero degrees is formed between lid 414 and base 416, when lid 414 is at the closed state. Antenna 407 may radiate radiation pattern 426 in a first direction, e.g., a backward direction with respect to lid 414. For example, antenna 407 may radiate at the backward direction due to reflections of mmwave wireless communication signals from a metallic material, e.g., which covers base 416 and lid 414.

As shown in FIG. 4B, lid 414 may be rotated to the open state, e.g., at which an angle of about ninety degrees is formed between lid 414 and base 416. RF module 420 and antenna 407 may rotate to a position, which is substantially orthogonal to a position of RF module 420 and antenna 407 at the closed state, e.g., by rotating lid 414 from the closed state to the open state.

As shown in FIG. 4B, antenna 407 may radiate radiation pattern 428 in a second direction, e.g., a forward direction with respect to lid 414. For example, RF module 420 may radiate at the forward direction due to reflections of mmwave wireless communication signals from one or more objects below base 416, e.g., a table or legs of a user of mobile device 400.

As shown in FIG. 4B, when lid 414 is at the open state, the user, e.g., facing mobile device 400, may be able to utilize mobile device 400.

As shown in FIG. 4B, antenna 407 may be able to radiate radiation pattern 426 through a gap, which is defined between lid 414 and an upper body of the user. The gap may enable mobile device 400 to communicate over the mmwave wireless communication band.

In some demonstrative embodiments, RF module 420 may utilize a beamforming algorithm to form a relatively high directional gain of antenna 407, e.g., when antenna 407 is at different positions, which may enable mobile device 400 to communicate over the mmwave band and to establish a mmwave wireless communication link.

Figure 4:
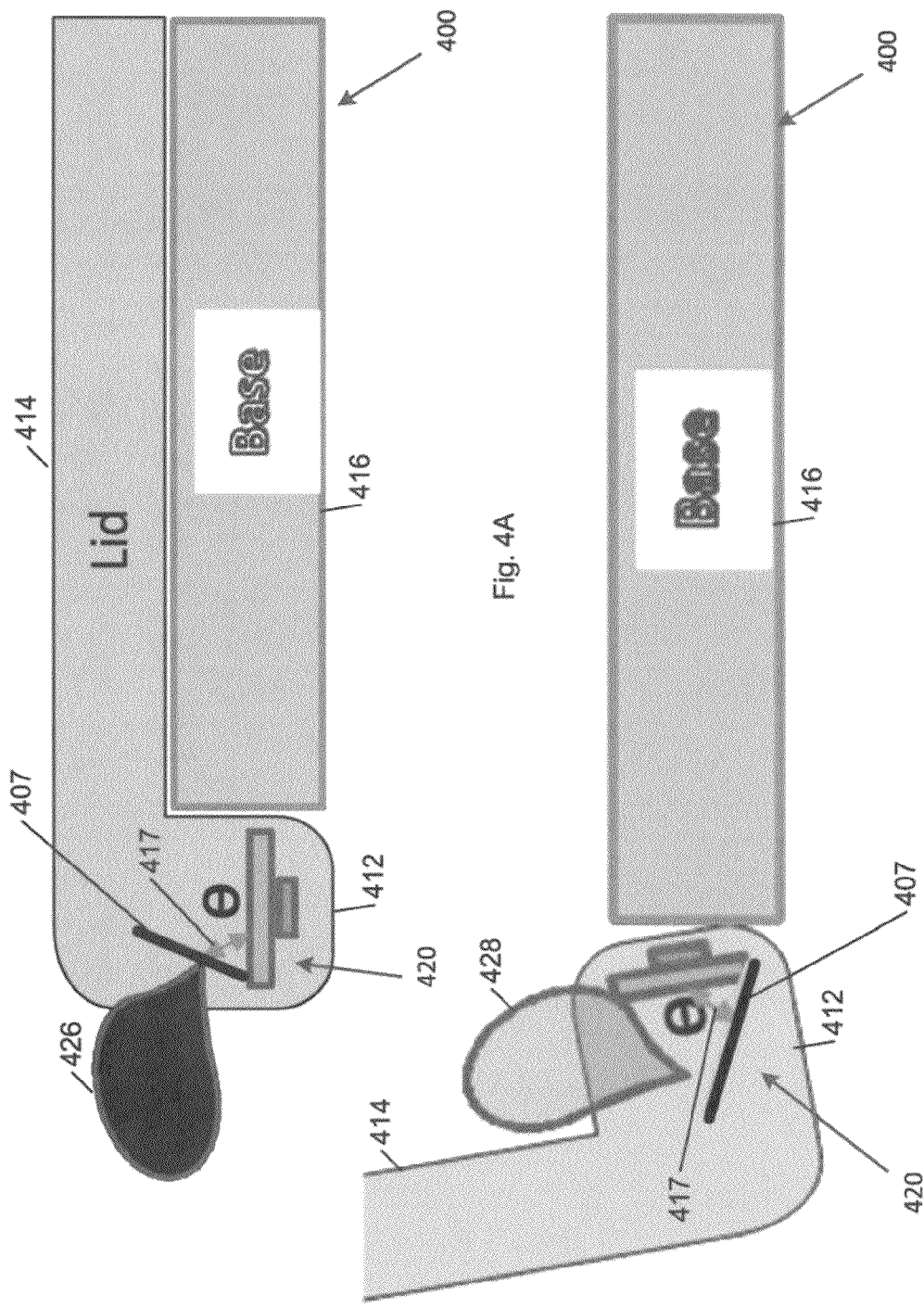
FIGS. 4A and 4B are schematic illustrations of a dual directional wireless communication antenna in closed and open states of a wireless communication device, in accordance with some demonstrative embodiments.
Figure 5:
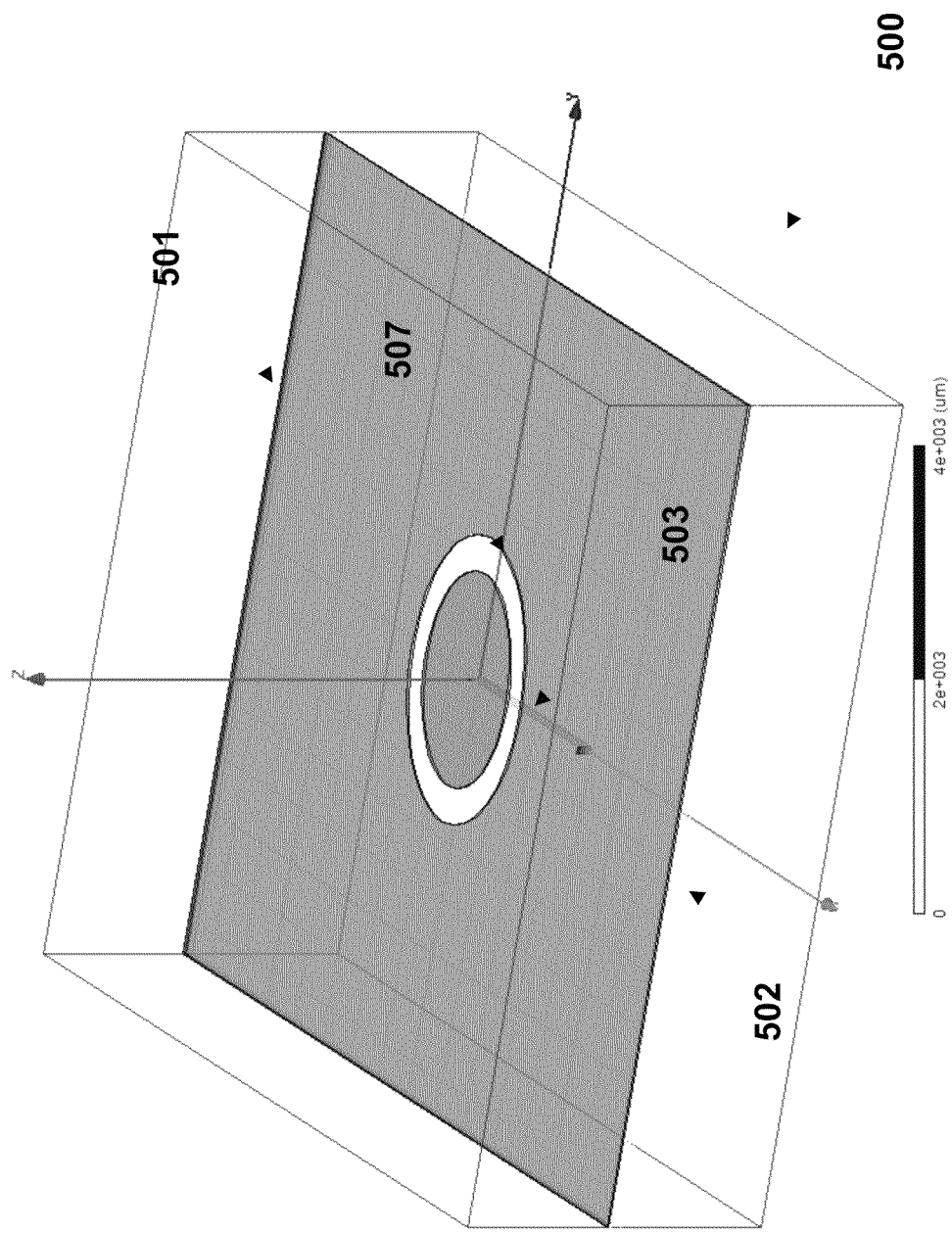
FIG. 5 is a schematic illustration of a dual directional wireless communication antenna, in accordance with some demonstrative embodiments.

Reference is now made to FIG. 5, which schematically illustrates an architecture 500 of a dual radiation antenna 507 formed by two metal layers, in accordance with some demonstrative embodiments. For example, antenna 507 may perform the functionality of antenna 107 (FIG. 1), antenna 307 (FIG. 3) and/or antenna 407 (FIG. 4).

As shown in FIG. 5, architecture 500 may include a first metal layer 501 and a second metal layer 502. Second metal layer 502 may include a feeding line 503 to antenna 507.

As shown in FIG. 5, architecture 500 may enable a dual radiation pattern of antenna 507, e.g., as described below with reference to FIG. 7. For example, architecture 500 may not include any additional layer, e.g., a reflection ground layer.

As shown in FIG. 5, antenna 507 may be designed as a slot loop on first metal layer 501. In other embodiments, antenna 507 may utilize other designs, e.g., a patch design, a slot design or any other suitable shapes.

Figure 6:
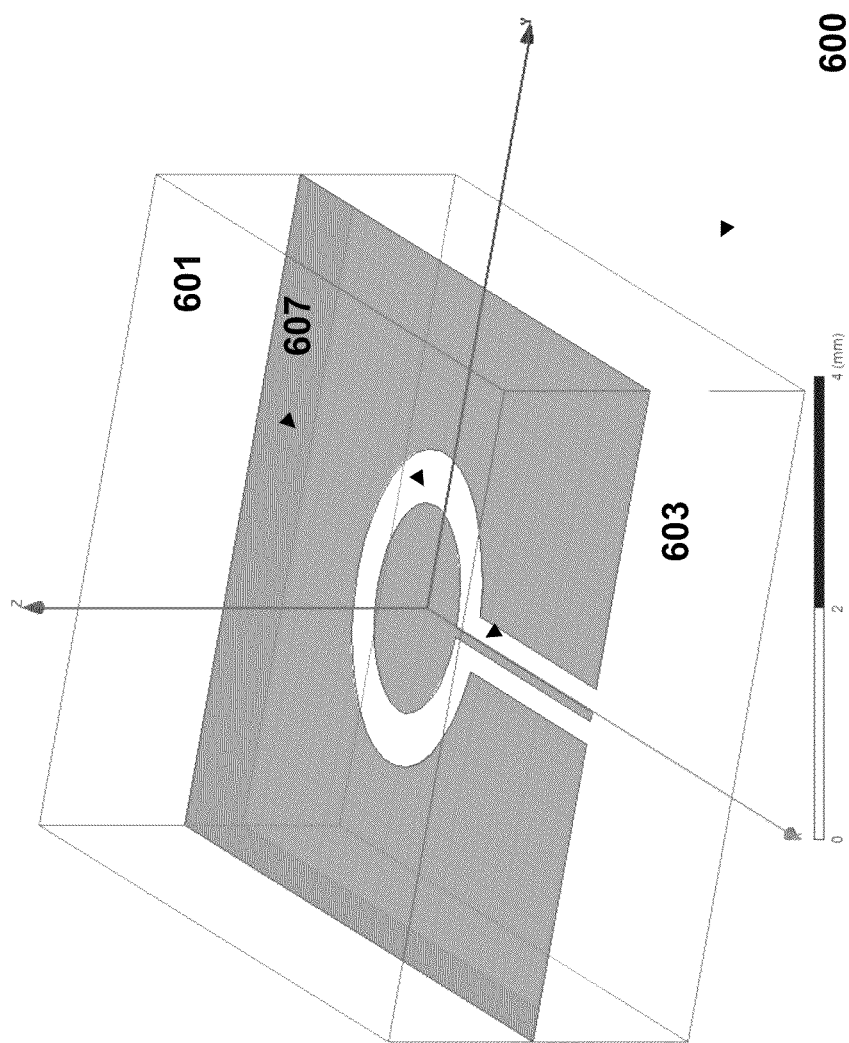
FIG. 6 is a schematic illustration of another dual directional wireless communication antenna, in accordance with some demonstrative embodiments.

Reference is now made to FIG. 6, which schematically illustrates another antenna architecture 600 of a dual radiation antenna 607 formed on a single metal layer 601, in accordance with some demonstrative embodiments. For example, antenna 607 may perform the functionality of antenna 107 (FIG. 1) antenna 307 (FIG. 3) and/or antenna 407 (FIG. 4).

As shown in FIG. 6, metal layer 601 may include antenna 607 and a feeding line 603 to antenna 607.

As shown in FIG. 6, antenna 607 may be designed as a slot loop on metal layer 601. In other embodiments, antenna 607 may be designed utilizing different designs, e.g., a patch design, a slot design or any other suitable shapes.

Figure 7:
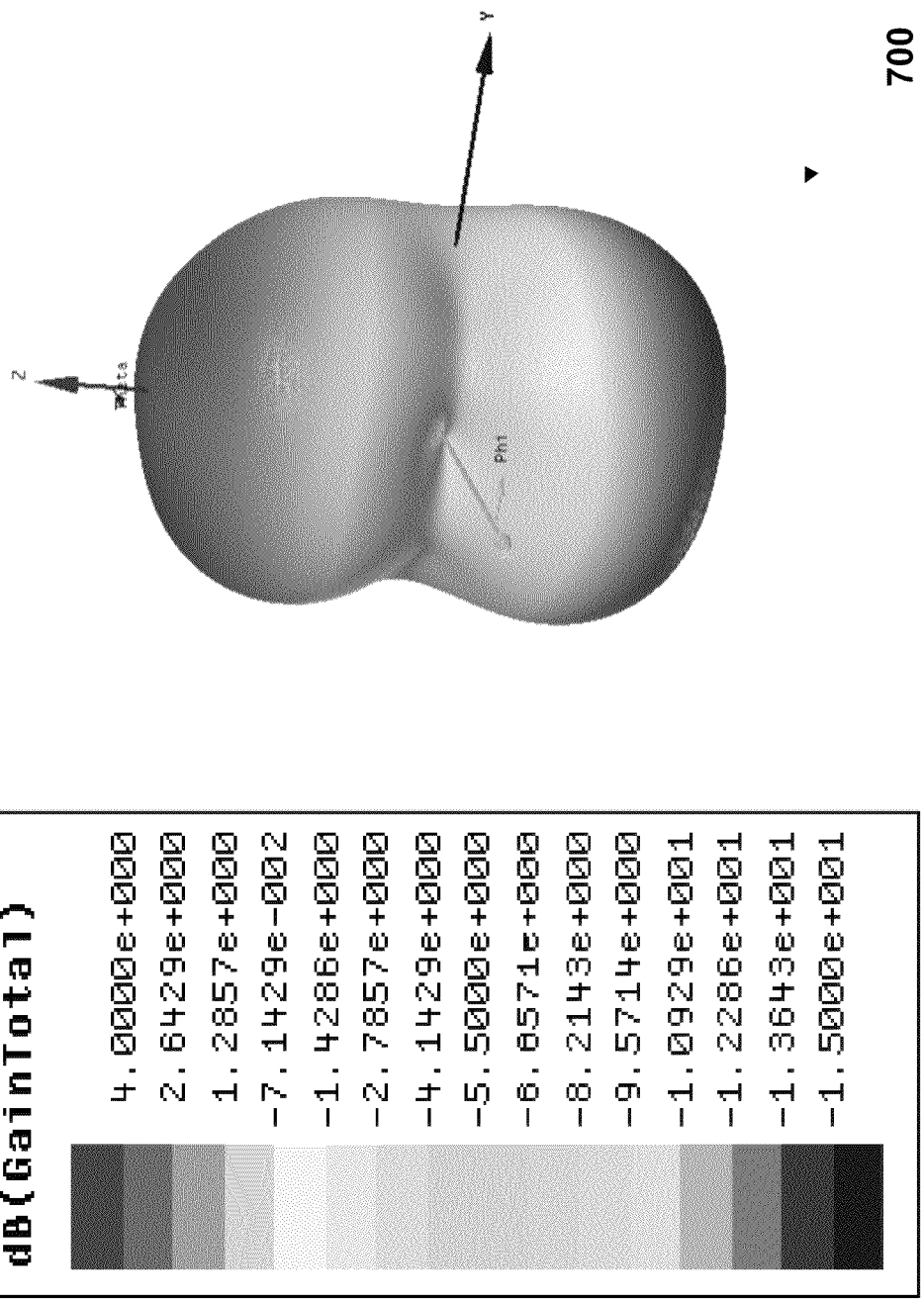
FIG. 7 is a schematic illustration of a radiation pattern of a dual directional wireless communication antenna, in accordance with some demonstrative embodiments.

Reference is now made to FIG. 7, which schematically illustrates a dual directional radiation pattern 700 of a dual directional wireless communication antenna, in accordance with some demonstrative embodiments. For example, antenna 107 (FIG. 1), antenna 307 (FIG. 3), antenna 407 (FIG. 4), antenna 507 (FIG. 5) and antenna 607 (FIG. 6) may be configured to generate dual directional radiation pattern 700.

Figure 8:
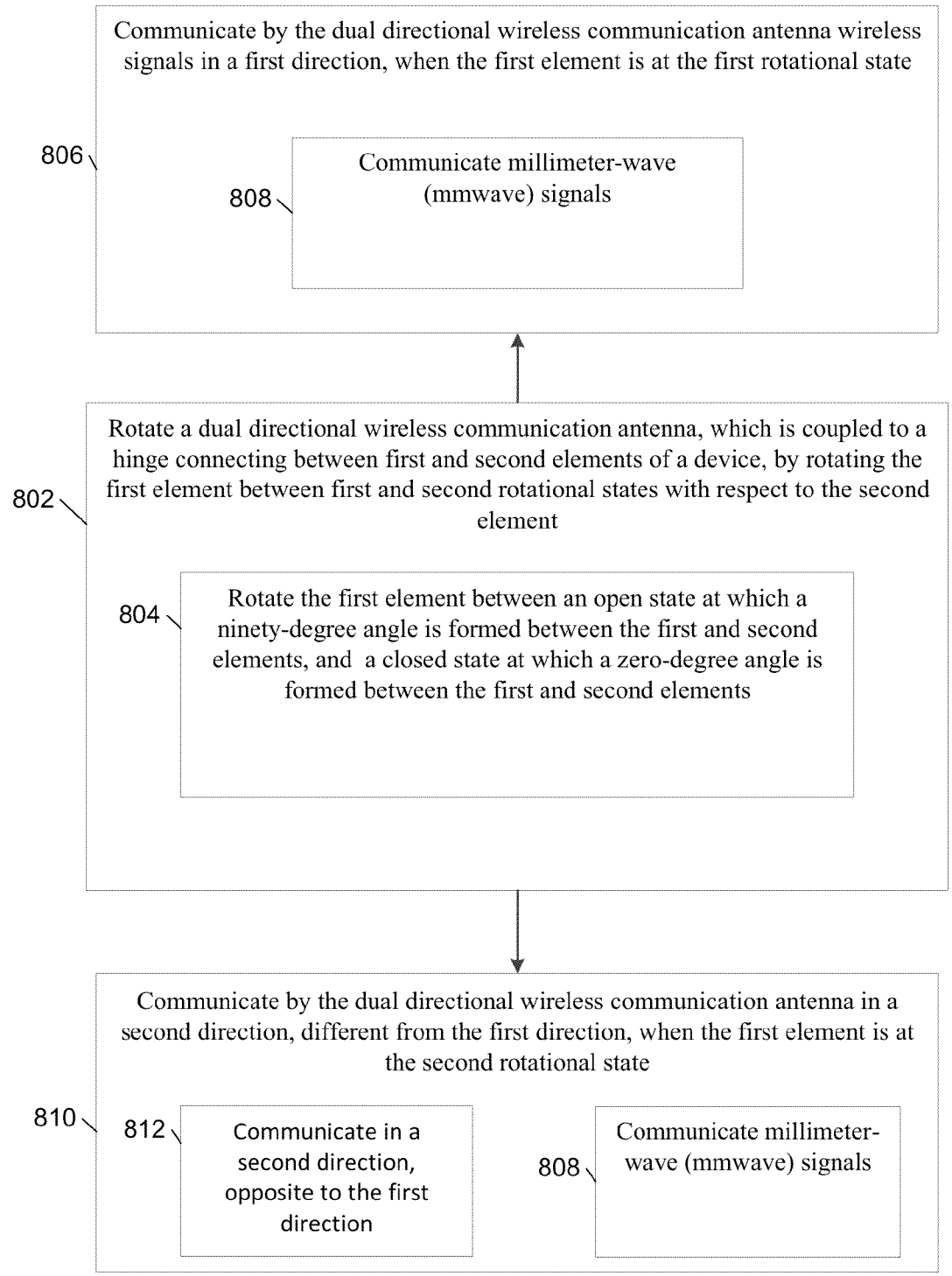
FIG. 8 is a schematic illustration of a method of communicating via a dual directional wireless communication antenna, in accordance with some demonstrative embodiments.

Reference is made to FIG. 8, which schematically illustrates a method of communicating via a dual radiation antenna, in accordance with some demonstrative embodiments. In some demonstrative embodiments, one or more of the operations of the method of FIG. 8 may be performed by any suitable wireless communication system, e.g., system 100 (FIG. 1), wireless communication device, e.g., device 102 (FIG. 1), an RF module, e.g., RF module 110 (FIG. 1), RF module 300 (FIG. 3) and/or RF module 420 (FIG. 4), and/or a dual radiation antenna, e.g., antenna 107 (FIG. 1), antenna 307 (FIG. 3), antenna 407 (FIG. 4), antenna 507 (FIG. 5) and/or antenna 607 (FIG. 6).

As indicated at block 802, the method may include rotating a dual directional wireless communication antenna, which is coupled to a hinge connecting between first and second elements of a device, by rotating the first element between first and second rotational states with respect to the second element. For example, antenna 107 (FIG. 1) may be rotated by rotating lid 114 (FIG. 1), e.g., as described above.

As indicated at block 804, rotating the first element between the first and second rotational states may include rotating the first element between an open state at which a first angle, e.g., about a ninety-degree angle, is formed between the first and second elements, and a closed state at which a second angle, e.g., a zero-degree angle, is formed between first and second elements. For example, lid 114 (FIG. 1) may be rotated between the open state and the closed state, e.g., as described above.

As indicated at block 806, the method may include communicating by the antenna wireless signals in a first direction, when the first element is at the first rotational state. For example, device 102 (FIG. 1) may communicate via antenna 107 (FIG. 1) wireless communication signals directed to a first direction when lid 114 (FIG. 1) is at the closed state, e.g., as described above.

As indicated at block 810, the method may include communicating by the antenna wireless communication signals in a second direction, different from the first direction, when the first element is at the second rotational state. For example, device 102 (FIG. 1) may communicate via antenna 107 (FIG. 1) wireless communication signals directed to a second, different, direction, e.g., opposite to the first direction, when lid 114 (FIG. 1) is at the open state, e.g., as described above.

As indicated at block 812, communicating by the antenna wireless signals in the second direction may include communicating the wireless communication signals directed to an opposite direction to the first direction. For example, device 102 (FIG. 1) may communicate via antenna 107 (FIG. 1) the wireless communication signals directed to an opposite direction to the first direction, e.g., as described above.

As indicated at block 808, communicating the wireless communication signals by the antenna may include communicating mmwave signals. For example, device 102 (FIG. 1) may communicate mmwave signals via antenna 107 (FIG. 1), e.g., as described above.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
   a hinge to connect between first and second elements, the hinge to allow rotating said first element between first and second rotational states with respect to said second element; and
   a dual directional millimeter-wave wireless communication antenna within said hinge, said dual directional millimeter-wave wireless communication antenna to communicate millimeter-wave wireless communication signals via a first radiation pattern in a first direction, when said first element is at said first rotational state, and to communicate said millimeter-wave wireless communication signals via a second radiation pattern in a second direction, different from said first direction, when said first element is at said second rotational state.

2. The device of claim 1, wherein the dual directional millimeter-wave wireless communication antenna is to communicate in frequencies of at least about 30 Gigahertz (GHz).

3. The device of claim 1, wherein said first element comprises a lid of said device, and said second element comprises a base of said device.

4. The device of claim 3, wherein said first rotational state comprises an open state at which a ninety-degree angle is formed between said lid and base, and said second rotational state comprises a closed state at which a zero-degree angle is formed between said lid and said base.

5. The device of claim 3 comprising a portable computing device selected from the group consisting of a laptop computer, an ultrabook computer, and a netbook computer.

6. The device of claim 1, wherein said dual directional millimeter-wave wireless communication antenna comprises an antenna element conformed to a shape of said hinge.

7. The device of claim 1, wherein said dual directional millimeter-wave wireless communication antenna comprises a flexible antenna element integrated with a radio-frequency integrated chip (RFIC).

8. The device of claim 1, wherein said hinge comprises a non-metal hinge.

9. The device of claim 1, wherein said first and second elements are at least partially covered by metallic material.

10. The device of claim 1, wherein said second direction is opposite to said first direction.

11. The device of claim 1, wherein said dual directional millimeter-wave wireless communication antenna comprises a phased array antenna.

12. The device of claim 1, wherein said dual directional millimeter-wave wireless communication antenna comprises a dipole antenna.

13. A computing device comprising:
a radio;
a lid at least partially covered by metallic material;
a base at least partially covered by metallic material; and
a hinge connecting between the lid and the base to allow rotating said lid between first and second rotational states with respect to said base, said hinge comprising a dual directional wireless communication antenna configured to communicate wireless communication signals, wherein, when the lid is at said first rotational state, the dual directional wireless communication antenna is to radiate said wireless communication signals in a first direction between said base and a first side of said lid, and when the lid is at the second rotational state, the dual directional wireless communication antenna is to radiate said wireless communication signals in a second direction outward from a second side of said lid.

14. The computing device of claim 13, wherein when the lid is at said second rotational state, said wireless communication signals are to be reflected from the metallic material covering said base.

15. The computing device of claim 13, wherein said first rotational state comprises an open state at which a ninety-degree angle is formed between said lid and said base, and wherein said second rotational state comprises a closed state at which a zero-degree angle is formed between said lid and said base.

16. The computing device of claim 13, wherein said dual directional wireless communication antenna comprises an antenna element conformed to a shape of said hinge.

17. The computing device of claim 13, wherein said dual directional wireless communication antenna comprises a flexible antenna element integrated with a radio-frequency integrated chip (RFIC).

18. The computing device of claim 13, wherein said hinge comprises a non-metal hinge.

19. The computing device of claim 13, wherein said second direction is opposite to said first direction.

20. The computing device of claim 13, wherein said wireless communication signals comprise millimeter-wave (mm-wave) signals.

21. The computing device of claim 13, wherein said dual directional wireless communication antenna comprises a phased array antenna.

* * * * *